US011065812B2

(12) United States Patent
Stammberger et al.

(10) Patent No.: US 11,065,812 B2
(45) Date of Patent: Jul. 20, 2021

(54) POWDER MODULE DEVICE FOR AN APPARATUS FOR ADDITIVELY MANUFACTURING THREE-DIMENSIONAL OBJECTS

(71) Applicant: CONCEPT LASER GMBH, Lichtenfels (DE)

(72) Inventors: Jens Stammberger, Rödental (DE); Christian Diller, Lichtenfels (DE); Tobias Gagel, Zapfendorf (DE); Alexander Hofmann, Weismain (DE)

(73) Assignee: CONCEPT LASER GMBH, Lichtenfels (DE)

( * ) Notice: Subject to any disclaimer, the term of this patent is extended or adjusted under 35 U.S.C. 154(b) by 33 days.

(21) Appl. No.: 16/125,027

(22) Filed: Sep. 7, 2018

(65) Prior Publication Data

US 2019/0099949 A1 Apr. 4, 2019

(30) Foreign Application Priority Data

Oct. 4, 2017 (EP) ..................... 17194818

(51) Int. Cl.
*B29C 64/259* (2017.01)
*B33Y 30/00* (2015.01)
(Continued)

(52) U.S. Cl.
CPC .......... *B29C 64/259* (2017.08); *B23K 26/342* (2015.10); *B28B 1/001* (2013.01);
(Continued)

(58) Field of Classification Search
CPC ........ B29C 64/259; B33Y 30/00; B33Y 40/00
See application file for complete search history.

(56) References Cited

U.S. PATENT DOCUMENTS 6,554,600 B1 4/2003 Hofmann et al.
6,881,048 B1 4/2005 Tokita
(Continued)

FOREIGN PATENT DOCUMENTS

CN 1268416 A 10/2000
CN 104640652 A 5/2015
(Continued)

OTHER PUBLICATIONS

European Search Report Corresponding to Application No. 1719818 dated Apr. 25, 2018.
(Continued)

*Primary Examiner* — Joseph S Del Sole
*Assistant Examiner* — Yung-Sheng M Tsui
(74) *Attorney, Agent, or Firm* — Dority & Manning, P.A.

(57) ABSTRACT

Powder module device (1) for an apparatus for additively manufacturing three-dimensional objects by successive layerwise selective irradiation and consolidation of layers of a powdered build material (2). The device includes a powder module (3), comprising a powder module base body (6) to receive a powdered build material (2), comprising wall elements; delimiting a build material receiving volume (9) for receiving a powdered build material (2) and an opening (10) for introducing powdered build material (2) into the build material receiving volume (9); a lid (4), comprising a lid base body (11) connected to the powder module base body (6) so as to close the opening (10) of the powder module base body (6) in a closed state of the powder module device (1); and a sealing device (5) configured to seal between the powder module (3) and the lid (4) in the closed state of the powder module device (1).

15 Claims, 4 Drawing Sheets

Figure 1:
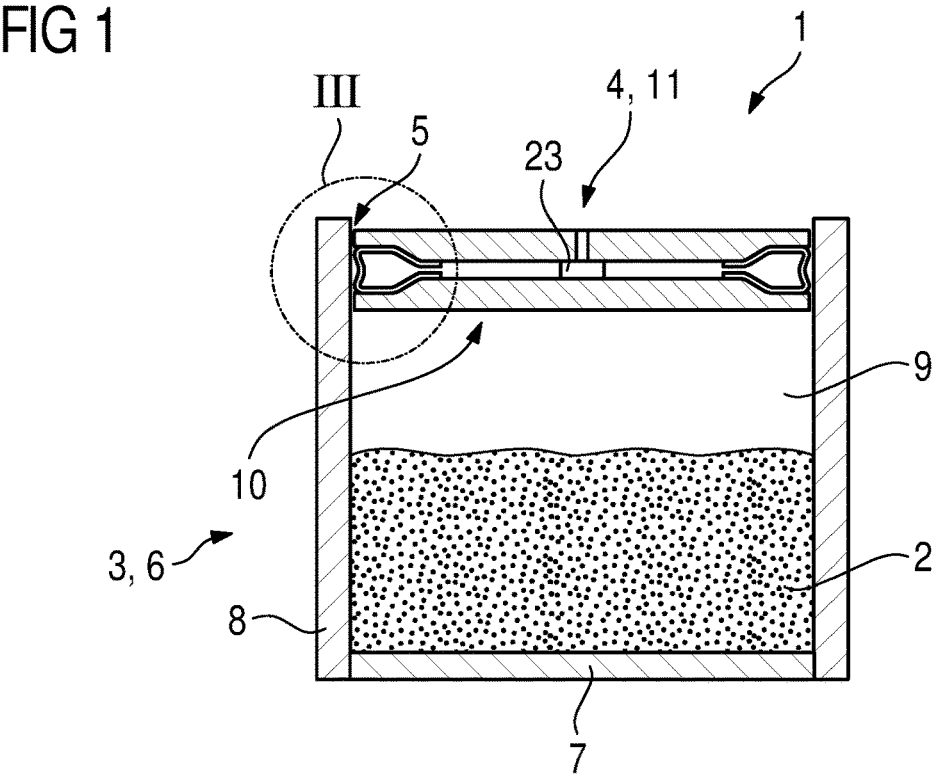

(51) Int. Cl.
  *B23K 26/342* (2014.01)
  *B28B 1/00* (2006.01)
  *B29C 64/321* (2017.01)
  *B33Y 40/00* (2020.01)
  *B29C 64/307* (2017.01)
  *B29C 64/255* (2017.01)
  *B29C 64/153* (2017.01)

(52) U.S. Cl.
  CPC .......... *B29C 64/255* (2017.08); *B29C 64/307* (2017.08); *B29C 64/321* (2017.08); *B33Y 30/00* (2014.12); *B33Y 40/00* (2014.12); *B29C 64/153* (2017.08)

(56) References Cited

U.S. PATENT DOCUMENTS

| | | | |
|---|---|---|---|
| 9,505,057 B2 | 11/2016 | Nordkvist et al. | |
| 9,808,864 B2 | 11/2017 | Kawada et al. | |
| 10,369,627 B2 | 8/2019 | Yoshimura | |
| 10,413,968 B2 | 9/2019 | Pialot et al. | |
| 2008/0006334 A1* | 1/2008 | Davidson | B33Y 30/00 137/571 |
| 2017/0369205 A1* | 12/2017 | Giulietti | B65D 25/42 |
| 2019/0039292 A1* | 2/2019 | Abbott | B29C 64/218 |
| 2020/0079012 A1* | 3/2020 | Pawliczek | B33Y 40/00 |
| 2020/0122231 A1* | 4/2020 | Brown | B22F 5/10 |

FOREIGN PATENT DOCUMENTS

| | | | | |
|---|---|---|---|---|
| CN | 105705275 A | 6/2016 | | |
| CN | 106132597 A | 11/2016 | | |
| DE | 102009029765 A1 | 12/2010 | | |
| DE | 102012009071 A1 | 11/2013 | | |
| DE | 202014009347 | 2/2016 | | |
| DE | 102014112454 A1 | 3/2016 | | |
| DE | 102015005780 A1 | 12/2016 | | |
| DE | 102015005780 A1 * | 12/2016 | ........... | B29C 64/259 |
| JP | S62066712 U | 4/1987 | | |
| JP | 2006/253453 A | 9/2006 | | |
| JP | 2008/183796 A | 8/2008 | | |
| JP | 2016/074967 A | 5/2016 | | |
| WO | 9534468 A1 | 12/1995 | | |
| WO | WO0021736 A | 4/2000 | | |
| WO | 2008061727 A1 | 5/2008 | | |
| WO | WO-2008061727 A1 * | 5/2008 | ............. | B33Y 40/00 |

OTHER PUBLICATIONS

Chinese Search Report Corresponding to Application No. 2017112761098 dated Jun. 27, 2020.

* cited by examiner

POWDER MODULE DEVICE FOR AN APPARATUS FOR ADDITIVELY MANUFACTURING THREE-DIMENSIONAL OBJECTS

CROSS-REFERENCE TO RELATED APPLICATIONS

This application claims priority to European Patent Application Ser. No. 17,194,818.5 filed Oct. 4, 2017, the contents of which is incorporated herein by reference in its entirety as if set forth verbatim.

The invention relates to a powder module device for an apparatus for additively manufacturing three-dimensional objects by means of successive layerwise selective irradiation and consolidation of layers of a powdered build material which can be consolidated by means of an energy beam.

Powder module devices for apparatuses for additively manufacturing three-dimensional objects are generally known from prior art. Respective powder module devices are configured to receive powered build material and may be embodied as dose module devices providing build material which is to be successively layerwise selectively irradiated and consolidated during an additive manufacturing process, build module devices providing a build plane in which powdered build material is successively layerwise selectively irradiated and consolidated during an additive manufacturing process, and an overflow module devices receiving build material which was not selectively irradiated and consolidated during an additive manufacturing process, for instance.

Respective powder module devices typically, comprise a powder module base body configured to receive a powdered build material. A respective powder module base body comprises a number of wall elements delimiting a build material receiving volume for receiving the powdered build material and an opening for introducing powdered build material into the build material receiving volume. Respective powder module devices may also comprise a lid. A respective lid comprises a lid base body configured to be connected to the powder module base body so as to close the opening in a closed state of the powder module device.

In view of generating and maintaining an inert atmosphere within the receiving volume of respective powder module base bodies, a reliable sealing between the powder modules and associated lids in the closed state of the powder module device is desirable. The sealing shall particularly, allow for transportation of a respective powder module device between diverse process stations of an additive manufacturing apparatus without compromising the inert atmosphere within the receiving volume of the powder module base body.

It is the object of the present invention to provide a powder module device allowing for a reliable sealing between the powder modules and associated lids in the closed state of the powder module device.

This object is achieved by a powder module device according to Claim 1. The claims depending on Claim 1 relate to possible embodiments of the powder module device according to Claim 1.

The powder module device specified herein can be used in an additive manufacturing process, e.g. a selective laser sintering process, a selective laser melting process, or a selective electron beam melting process, in which a powdered build material ("build material"), e.g. a powdered ceramic, metal, or polymer, is successively layerwise irradiated and thereby, consolidated by means of at least one energy beam, e.g. a laser or electron beam. Therefore, the powder module device is typically assigned to an apparatus for additively manufacturing three-dimensional objects ("additive manufacturing apparatus") by means of successive layerwise selective irradiation and consolidation of layers of a build material which can be consolidated by means of an energy beam. A respective additive manufacturing apparatus can be embodied as a selective laser sintering apparatus, a selective laser melting apparatus, or a selective electron beam melting apparatus, for instance.

As will be apparent from the forthcoming specification of the functional components of the powder module device, the powder module device is generally configured to receive build material, i.e. the powder module device can be charged with build material and build material can be discharged from the powder module device. As an exemplary embodiment, the powder module device may be embodied as dose module device configured to dose build material which is to be successively layerwise selectively irradiated and consolidated during an additive manufacturing process, a build module device which is configured to define a build plane in which build material is successively layerwise selectively irradiated and consolidated during an additive manufacturing process, or an overflow module device which is configured to receive build material which was not selectively irradiated and consolidated during an additive manufacturing process, for instance.

The powder module device comprises three essential functional components: a powder module, a lid, and a sealing device.

The powder module comprises a powder module base body which is configured to receive a build material. The powder module base body comprises a number of wall elements, particularly a bottom wall element, which may be embodied as vertically moveably supported carrier element, and at least one side wall element, delimiting a build material receiving volume—which may also be deemed or denoted as build material receiving chamber—for receiving a specific amount of build material and an opening for introducing build material into the build material receiving volume. The powder module base body may have a cuboid or cuboid-like geometric basic shape. The opening of a cuboid or cuboid-like shaped powder module base body is typically provided at a face side of the powder module base body, particularly the face side facing the process chamber of an additive manufacturing apparatus when the powder module device is attached to an additive manufacturing apparatus, particularly docked at an additive manufacturing apparatus. The aforementioned arrangement of the opening applies to geometric basic shapes other than cuboid or cuboid-like basic shapes in analogous manner.

The lid comprises a lid base body which is configured to be, particularly detachably, connected to the powder module base body so as to (physically) close the opening of the powder module base body in a closed state of the powder module device. The lid base body may have a plate or plate-like geometric basic shape. In either case, the geometric basic shape of the lid base body is adapted to the geometric basic shape of the powder module base body so as to allow for closing the opening of the powder module base body.

In the closed state of the powder module device, the main plane of the lid base body is typically arranged parallel to a bottom wall element of the powder module base body. Thereby, a wall portion of the lid base body faces a wall portion delimiting the build material receiving volume, particularly of a side wall element, of the powder module base body.

The sealing device is configured to seal, particularly fluid-proof, between the powder module and the lid in the closed state of the powder module device. The sealing device comprises at least one expandable sealing element ("sealing element"). Since the sealing element is expandable, it is made of an expandable sealing material, i.e. a sealing material, e.g. an elastomer, having expandable properties. The sealing element comprises at least one expandable volume which is at least partly controllably fillable with a, particularly pressurized, expansion medium, e.g. a gas and/or a liquid, so as to expand the sealing element from a first expansion state to a second expansion state. In other words, the expandable volume can be filled with an expansion medium so as to allow for a controlled increase of the volume of the sealing element and expansion medium can be unfilled from the expandable volume so as to allow for a controlled decrease of the volume of the sealing element, respectively. By expanding the expandable volume and the sealing element, respectively in the closed state of the powder module device a, particularly fluid-proof sealing, can be provided between the powder module and the lid. Respective filling and unfilling processes of the expandable volume are typically controlled by a hard- and/or software embodied control unit which is configured to semi-automatically or automatically control semi-automatic or automatic filling and unfilling processes of the expandable volume with an expansion medium.

Typically, the sealing element does not provide a, particularly fluid-proof, sealing between the powder module and the lid in the first expansion state and does provide a, particularly fluid-proof, between the powder module and the lid in the second expansion state. Hence, the expandable volume and the sealing element, respectively is less expanded in the first expansion state than in the second expansion state. Particularly, in the first expansion state, the expandable volume and the sealing element, respectively is not or less expanded compared with the second expansion state so as not to provide a sealing between the powder module and the lid in the first expansion state and the expandable volume. In the second expansion state, the expandable volume and the sealing element, respectively is expanded or more expanded compared with the first expansion state so as to provide a sealing between the powder module and the lid. Thus, the first expansion state, in which the expandable volume is smaller compared with the second expansion state, typically refers to an unsealed state in which a, particularly fluid-proof, sealing between the powder module and the lid is not given and the second expansion state, in which the expandable volume is larger compared with the first expansion state, typically refers to a sealed state in which a, particularly fluid-proof, sealing between the powder module and the lid is given.

The sealing device provides a reliable sealing between the powder module and associated lid in the closed state of the powder module device. The sealing device allows for generating and maintaining an inert atmosphere within the build material receiving volume of the powder module base body. Particularly, the sealing device allows for transportation of the powder module device between diverse process stations of an additive manufacturing apparatus or an additive manufacturing plant comprising at least one additive manufacturing apparatus without compromising the inert atmosphere within the build material receiving volume of the powder module base body.

As mentioned above, the expansion medium may be a gas or liquid. In the first case, the at least one expandable volume is fillable with a gaseous expansion medium, whereby a first filling state of the expandable volume corresponds to the first expansion state of the expandable sealing element and a second filling state of the expandable volume corresponds to the second expansion state of the expandable sealing element. A respective gaseous expansion medium can be an inert gas, e.g. argon, carbon dioxide, nitrogen, etc. In the second case, the at least one expandable volume is fillable with a liquid expansion medium, whereby a first filling state of the expandable volume corresponds to the first expansion state of the expandable sealing element and a second filling state of the expandable volume corresponds to the second expansion state of the expandable sealing element. A respective liquid medium can be an inorganic or organic liquid, e.g. water, oil, etc.

The or at least one respective sealing element may be attached to or connected with the lid base body. Thereby, it may be received in at least one, particularly groove-like shaped, receiving portion of the lid base body, the receiving portion being configured to receive the sealing element. Receiving the sealing element in the receiving portion of the lid base body typically, comprises a, particularly non-detachable, attachment or connection of the sealing element to or with the lid base body. In this regard, any ways of chemically and/or physically attaching the sealing element to the lid base body are conceivable. Only as an example, the sealing element may be clamped, glued welded to the lid base body. The sealing element may be comprise distinct attaching or connecting portions allowing for a firm attachment or connection of the sealing element to or with the lid base body.

The receiving portion of the lid base body may at least partly extend along the outer circumference of the lid base body, particularly a wall portion of the lid base body facing a wall portion of a wall element of the powder module base body in the closed state of the powder module device. Hence, the sealing element received in a respective receiving portion may at least partly extend along the outer circumference of the lid base body.

The or another sealing element may (also) be attached to or connected with the powder module base body. Thereby, it may be received in at least one, particularly groove-like shaped, receiving portion of the powder module base body, the receiving portion being configured to receive the sealing element. Receiving the sealing element in the receiving portion of the powder module base body typically, comprises a, particularly non-detachable, attachment or connection of the sealing element to or with the powder module base body. In this regard, any ways of chemically and/or physically attaching the sealing element to the powder module base body are conceivable. Only as an example, the sealing element may be clamped, glued welded to the powder module base body. The sealing element may comprise distinct attaching or connecting portions allowing for a firm attachment or connection of the sealing element to or with the powder module base body.

The receiving portion of the powder module base body may at least partly extend along the inner circumference of the powder module base body, particularly a wall portion of a side wall element of the powder module base body facing a wall portion of the lid base body in the closed state of the powder module device. Hence, the sealing element received in a respective receiving portion may at least partly extend along the inner circumference of the powder module base body.

The lid base body and/or the powder module base body may comprise a streaming channel structure, particularly extending within the lid base body or the powder module base body, respectively. The streaming channel structure, which may be fully integrated within the lid base body and/or powder module base body, respectively, may define a streaming path for the expansion medium to and from the expandable volume, i.e. a streaming path for the expansion medium during filling or unfilling of the sealing element. The streaming channel structure may comprise a first connecting portion for connecting the streaming channel structure with the expandable volume of the sealing element and a second connecting portion for connecting the streaming channel structure with a filling device, e.g. a compressor, pump, etc., for filling or unfilling the expandable volume with the expansion medium. Hence, the first connecting portion may communicate with the expandable volume of the sealing element and the second connecting portion may communicate with a filling device for filling or unfilling the expandable volume with the expansion medium.

In the case that the streaming channel structure is provided with the lid base body, the second connecting portion may be provided at a handling portion, e.g. a grasping or gripping portion, of the lid base body which is configured to co-act with a handling device, e.g. a robot, for manually, semi-automatically, or automatically handling the lid base body.

At least one valve device may be disposed between the first connecting portion and the second connecting portion of a respective streaming channel structure. The valve device may comprise at least one valve element which is moveably supported between a first operational or closed state, i.e. particularly a first orientation and/or position, in which filling the expandable volume of the sealing element with the expansion medium is not possible and a second operational or open state, i.e. particularly a second orientation and/or position, in which filling the expandable volume of the sealing element with the expansion medium is possible. In the second operational state, the valve element is orientated and/or positioned in such a manner that it creates a passageway for the expansion medium through the valve device so as to allow for filling or unfilling the expandable volume of the sealing element.

The valve device may comprise different ports having different functionalities. A first port of the valve device may be conceived for applying a, particularly pressurized, control medium for moving the valve element, particularly against the force of at least one spring element moving/urging the at least one valve element towards the first operational state. Thus, the control medium, e.g. a control gas or a control liquid, may stream into the valve device via the first port so as to move the valve element from the first operational state to the second operational state. The control medium may be provided from the filling device for filling or unfilling the expandable volume with the expansion medium or a separate supplying device, e.g. a compressor, pump, etc., for supplying the control medium.

A second port of the valve device may be conceived for introducing the expansion medium for expanding the sealing element. Thus, the expansion medium may stream into the valve device via the second port so as to change the volume of the sealing element, i.e. to bring the sealing element in the first or second expansion state, in the manner described above. Typically, the expansion medium will only be introduced via the second port when the valve element is moved to the second operational state in which a passageway for the expansion medium through the valve device is created.

The powder module device may comprise a plurality of sealing elements. At least one sealing element may be received in a respective receiving portion of the powder module base body and at least one further sealing element may be received in a respective receiving portion of the lid base body. In either case, the plurality of sealing elements may be disposed, particularly in a parallel or stack-like arrangement on top of each other in the closed state of the powder module device. The sealing efficiency and operational safety of the sealing device may be improved by providing a plurality of, particularly independent, sealing elements.

The invention also relates to a lid for a powder module device as specified above. The comprises a lid base body configured to be connected to the powder module base body of a powder module device so as to close the opening of the powder module base body in a closed state of the powder module device. The lid comprises a sealing device configured to seal, particularly fluid-proof, between the powder module and the lid in the closed state of the powder module device, the sealing device comprising at least one sealing element, the sealing element comprising at least one expandable volume which is at least partly fillable with an expansion medium so as to expand the expandable sealing element from a first expansion state to a second expansion state. All annotations concerning the powder module device apply to the lid in analogous manner.

Further, the invention relates to an apparatus for additively manufacturing three-dimensional objects, e.g. technical components, by means of successive layerwise selective irradiation and consolidation of layers of a build material which can be consolidated by means of an energy beam. The apparatus may be embodied as a selective laser sintering apparatus, a selective laser melting apparatus or a selective electron beam melting apparatus, for instance. The apparatus has a number of functional and/or structural units which are used during its operation. One exemplary functional unit is an irradiation device which serves for selectively irradiating a build material layer provided in a build plane within the process chamber of the apparatus with an energy beam.

The apparatus comprises at least one powder module device as specified above. The at least one powder module device comprises a first lid. The first lid comprises a lid base body configured to be connected to the powder module base body so as to close the opening of the powder module base body in a closed state of the powder module device. The powder module device further comprises a sealing device configured to seal, particularly fluid-proof, between the powder module and the first lid in the closed state of the powder module device. The sealing device comprises at least one expandable sealing element. The expandable sealing element comprises at least one expandable volume which is at least partly fillable with a, particularly pressurized, expansion medium so as to expand the expandable sealing element from a first expansion state to a second expansion state.

Alternatively or additionally, the apparatus comprises at least one second lid. The second lid comprises a lid base body configured to be connected with a machine frame of the apparatus, particularly at a powder module docking portion defining a docking interface at which a powder module device can dock to the machine frame of the apparatus, so as to close an opening in the machine frame of the apparatus, particularly at the powder module docking portion defining a docking interface at which a powder module device can dock to the machine frame of the apparatus. The second lid comprises a sealing device configured to seal, particularly fluid-proof, between the machine frame of the apparatus and the second lid in the closed state of the machine frame of the apparatus. The sealing device comprises at least one expandable sealing element. The expandable sealing element comprises at least one expandable volume which is at least partly fillable with an expansion medium so as to expand the expandable sealing element from a first expansion state to a second expansion state.

The first and second lid elements may have the same technical configuration, i.e. may be, at least in functional regard, identical. It is also possible that the first and second lid elements may have the same geometrical configuration, i.e. may be, at least in geometrical regard, identical. Hence, it is possible that first and second lids may be interchangeable.

Both the first and second lid serve to, in particular co-act to, provide a sealable, particularly fluid-proof, lock (double-lock) between the powder module device docked at the machine frame of the apparatus, i.e. at a powder module docking portion which typically is or comprises an opening in the bottom of the process chamber of the apparatus, and the process chamber of the apparatus. Thereby, a first lock assigned to the powder module device, i.e. in the region of the powder module device, can be built by the first lid and a second lock assigned to the machine frame of the apparatus, i.e. in the region of the machine frame of the apparatus, can be built by the second lid.

The second lid can be disposed above the first lid when the powder module device is in the docking position. Hence, the first and second lids may be disposed in a parallel or stack-like arrangement. In either case, the first lid is connectable or connected with the powder module (base body) and the second lid is connectable or connected with the machine frame of the apparatus.

All annotations concerning the powder module device apply to the additive manufacturing apparatus in analogous manner.

The invention further relates to a method for docking a powder module device as specified above to an apparatus as specified above. The method comprises the steps of:

a) disposing a powder module device in a docking position in which it is docked at the machine frame of the apparatus, b) disconnecting and removing the first lid provided with the powder module device from the powder module device, and c) disconnecting and removing the second lid from the machine frame of the apparatus so as to open a passageway from the build material receiving volume of the powder module base body to the process chamber of the apparatus.

Steps b) and c) may be executed simultaneously or in a different order. All steps may be executed at least in semi-automatic manner.

The invention further relates to a method for undocking a powder module device as specified above from an apparatus as specified above. The method comprises the steps of:

a) connecting the first lid provided with the powder module device with the powder module device being disposed in a docking position in in which it is docked at the machine frame of the apparatus;

b) connecting the second lid from the machine frame of the apparatus so as to close a passageway from the build material receiving volume of the powder module base body to the process chamber of the apparatus; and c) removing the powder module device disposed in a docking position in which it is docked at the machine frame of the apparatus from the docking position.

Steps a) and b) may be executed simultaneously or in a different order. All steps may be executed at least in semi-automatic manner.

All annotations concerning the powder module device and the apparatus apply to the methods in analogous manner.

Figure 3:
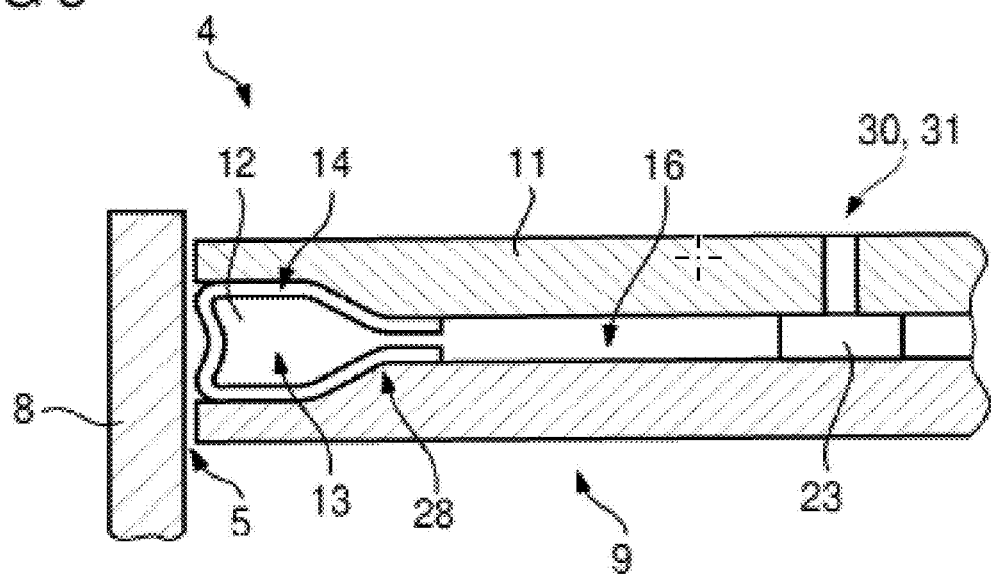
Figure 5:
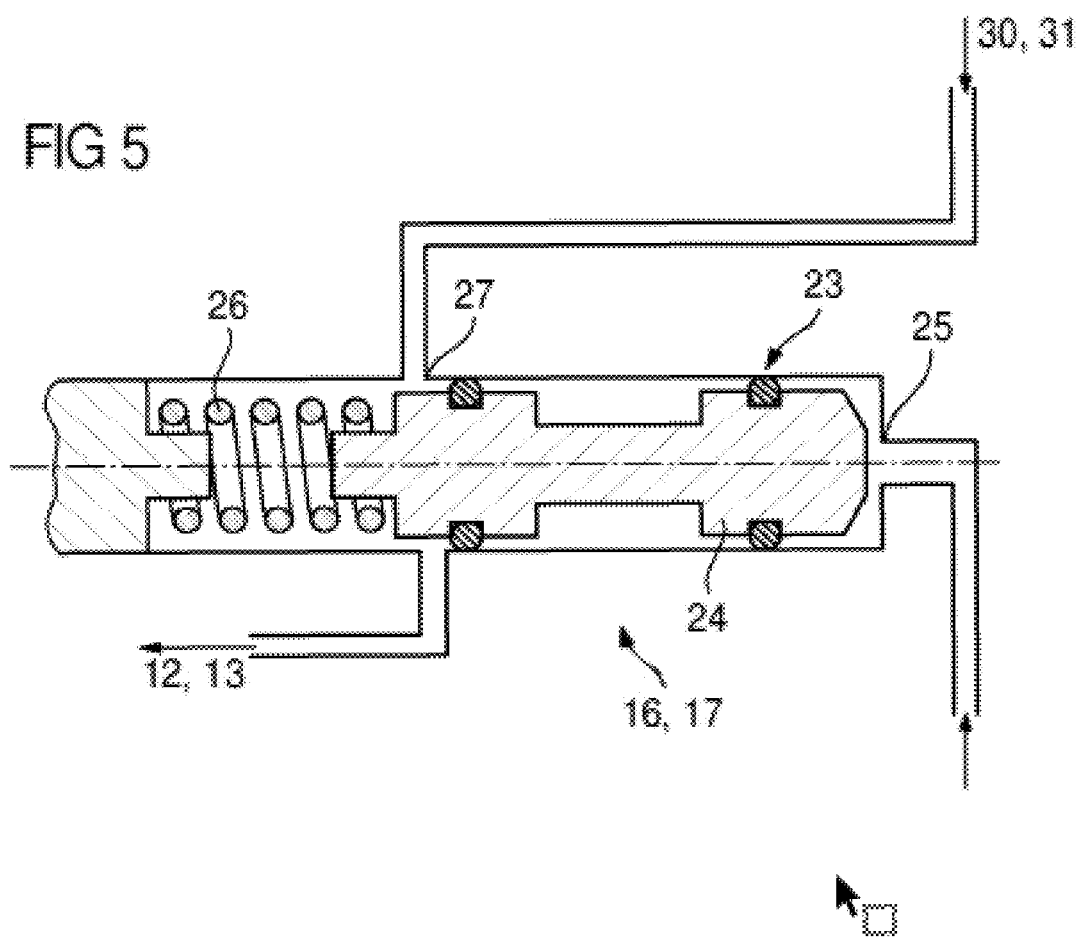
Figure 7:
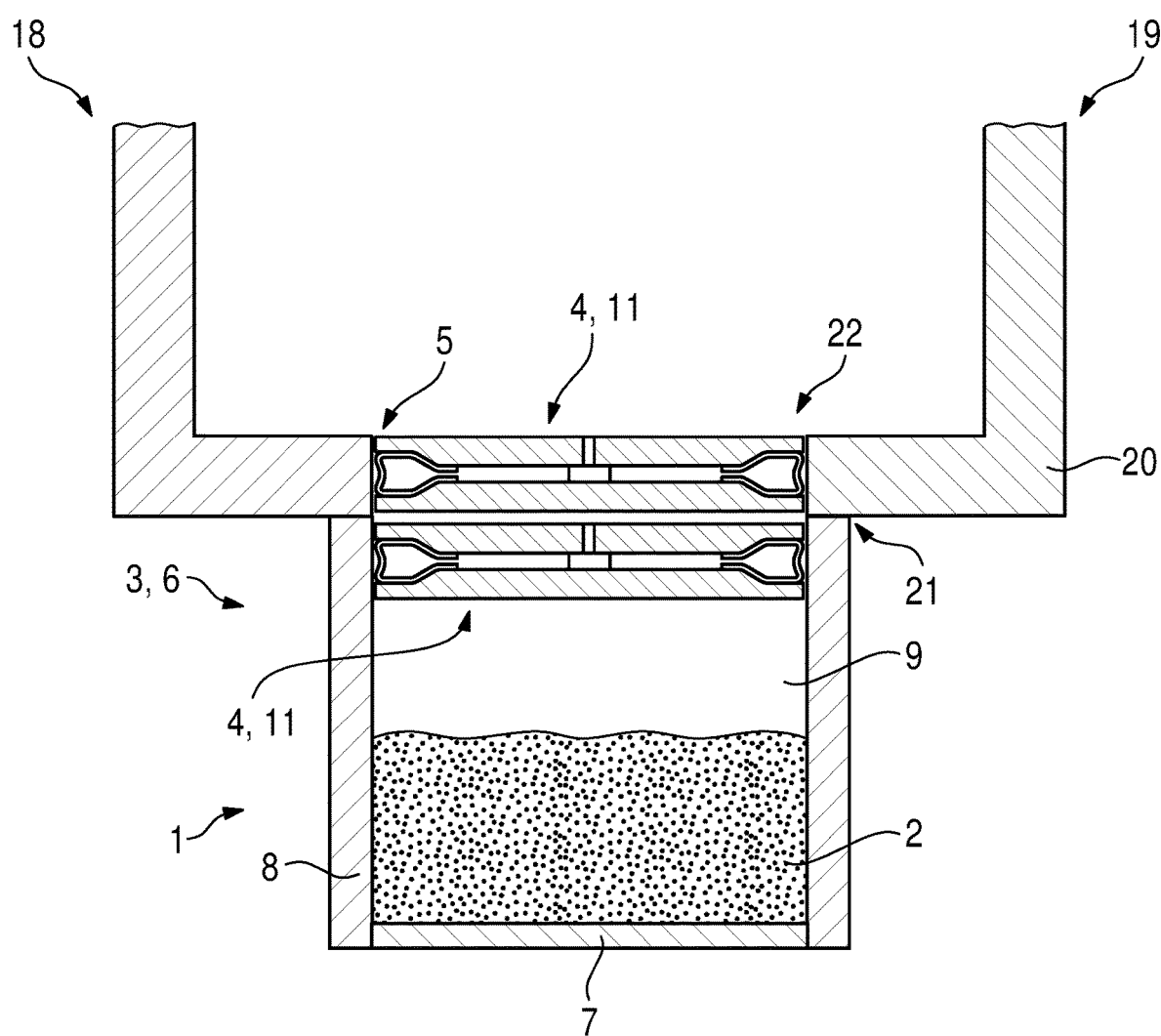

Exemplary embodiments of the invention are described with reference to the FIG., whereby FIG. 1, 2 each show a principle drawing of a powder module device according to an exemplary embodiment;

FIG. 3, 4 each show an enlarged drawing of the detail Ill of FIG. 1;

FIG. 5, 6 each show an enlarged drawing of a valve device of a powder module device according to an exemplary embodiment; and FIG. 7 shows a principle drawing of an apparatus for additively manufacturing three-dimensional objects according to an exemplary embodiment.

FIG. 1 shows a principle drawing of a powder module device 1 for an apparatus for additively manufacturing three-dimensional objects, e.g. technical components, by means of successive layerwise selective irradiation and accompanying consolidation of layers of a powdered build material 2 which can be consolidated by means of an energy beam according to an exemplary embodiment. FIG. 1 shows the powder module device 1 in a cut-view.

The powder module device 1 can be used in an additive manufacturing process, e.g. a selective laser sintering process, a selective laser melting process, or a selective electron beam melting process, in which a powdered build material 2, e.g. a powdered ceramic, metal, or polymer, is successively layerwise irradiated and thereby, consolidated by means of at least one energy beam, e.g. a laser or electron beam. Therefore, the powder module device 1 is assigned to an additive manufacturing apparatus (not shown), e.g. a selective laser sintering apparatus, a selective laser melting apparatus, or a selective electron beam melting apparatus.

As is apparent from FIG. 1, 2, the powder module device 1 is generally configured to receive build material 2, i.e. the powder module device 1 can be charged with build material 2 and build material 2 can be discharged from the powder module device 1. As a concrete embodiment, the powder module device 1 may be embodied as dose module device configured to dose build material 2 which is to be successively layerwise selectively irradiated and consolidated during an additive manufacturing process, a build module device which is configured to define a build plane in which build material 2 is successively layerwise selectively irradiated and consolidated during an additive manufacturing process, or an overflow module device which is configured to receive build material 2 which was not selectively irradiated and consolidated during an additive manufacturing process.

The powder module device 1 comprises three essential functional components: a powder module 3, a lid 4, and a sealing device 5.

The powder module 3 comprises a powder module base body 6 which is configured to receive a build material 2. The powder module base body 6 comprises a number of wall elements, i.e. a bottom wall element 7, which may be embodied as vertically moveably supported carrier element, and at least one side wall element 8 delimiting a build material receiving volume 9 or build material receiving chamber, respectively for receiving a specific amount of build material 2 and delimiting an opening 10 for introducing build material 2 into the build material receiving volume 9. According to the exemplary embodiments depicted in the FIG., the powder module base body 6 has a cuboid or cuboid-like geometric basic shape. The opening 10 of the powder module base body 6 is provided at a face side of the powder module base body 6 facing the process chamber (not shown) of an additive manufacturing apparatus when the powder module device 1 is attached to an additive manufacturing apparatus.

The lid 4 comprises a lid base body 11 which is configured to be, particularly detachably, connected to the powder module base body 6 so as to (physically) close the opening 10 of the powder module base body 6 in a closed state of the powder module device 1 (see FIG. 1, 2). According to the exemplary embodiments depicted in the FIG., the lid base body 11 has a plate or plate-like geometric basic shape. The geometric basic shape of the lid base body 11 is adapted to the geometric basic shape of the powder module base body 6 so as to allow for closing the opening 10 of the powder module base body 6.

As is discernible from FIG. 1, 2, the main plane of the lid base body 11 is arranged parallel to the bottom wall element 7 of the powder module base body 6 in the closed state of the powder module device 1. Thereby, wall portions of the lid base body 11 face wall portions delimiting the build material receiving volume 9, namely wall portions of side wall element 8 of the powder module base body 6.

Figure 4:
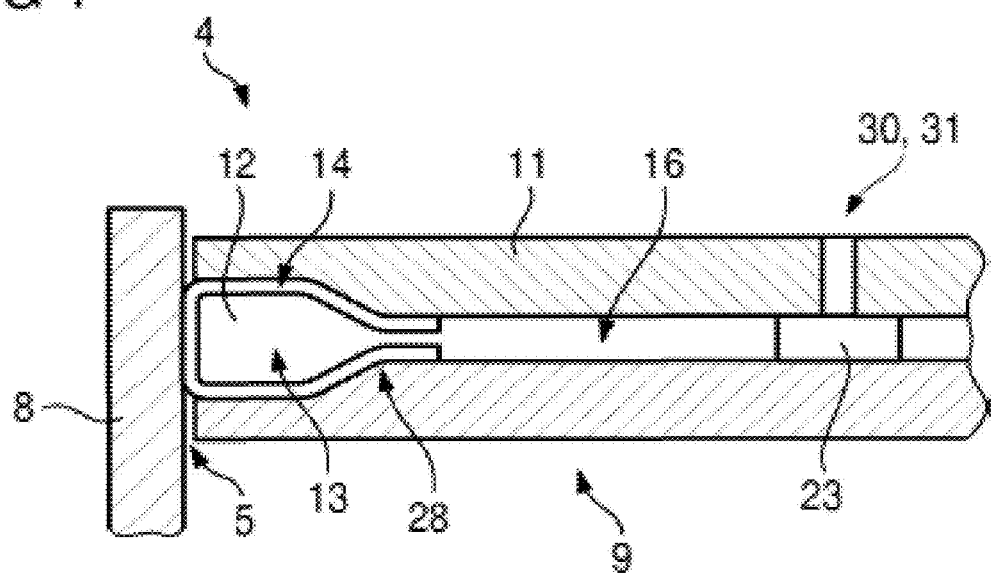

The sealing device is 5 configured to seal, particularly fluid-proof, between the powder module 3 and the lid 4 in the closed state of the powder module device 1. The sealing device 5 comprises an expandable sealing element 12 made of an expandable sealing material, i.e. a sealing material, e.g. an elastomer, having expandable properties. The sealing element 12 comprises at least one expandable volume 13 which is at least partly controllably fillable with a, particularly pressurized, expansion medium, e.g. a gas and/or a liquid, so as to expand the sealing element from 12 a first expansion state (see FIG. 3) to a second expansion state (see FIG. 4). In other words, the expandable volume 13 can be filled with an expansion medium so as to allow for a controlled increase of the volume of the sealing element 12 and expansion medium can be unfilled from the expandable volume 13 so as to allow for a controlled decrease of the volume of the sealing element 12, respectively. By expanding the expandable volume 13 and the sealing element 12, respectively in the closed state of the powder module device 1a, particularly fluid-proof sealing, can be provided between the powder module 3 and the lid 4. Filling and unfilling processes of the expandable volume 13 are controlled by a hard- and/or software embodied control unit (not shown) which is configured to semi-automatically or automatically control semi-automatic or automatic filling and unfilling processes of the expandable volume 13 with an expansion medium.

The sealing element 12 does not seal, particularly fluid-proof, between the powder module 3 and the lid 4 in the first expansion state and does seal, particularly fluid-proof, between the powder module 3 and the lid 4 in the second expansion state. As is discernible from FIG. 3, 4, the expandable volume 13 and the sealing element 12, respectively is less expanded in the first expansion state than in the second expansion state. The first expansion state, in which the expandable volume 13 is smaller compared with the second expansion state refers to an unsealed state in which a, particularly fluid-proof, sealing between the powder module 3 and the lid 4 is not given and the second expansion state, in which the expandable volume 13 is larger compared with the first expansion state refers to a sealed state in which a, particularly fluid-proof, sealing between the powder module 3 and the lid 4 is given.

According to the embodiments depicted in the FIG., the expansion medium is gaseous. Thus, the expandable volume 13 is fillable or filled with a gaseous expansion medium, e.g. argon, carbon dioxide, nitrogen. Thereby, a first filling state (see FIG. 1) of the expandable volume 13 corresponds to the first expansion state of the expandable sealing element 12 and a second filling state (see FIG. 2) of the expandable volume 13 corresponds to the second expansion state of the expandable sealing element 12.

According to the embodiment depicted in FIG. 1, the sealing element 12 is attached to or connected with the lid base body 11. Thereby, it is received in at least one, particularly groove-like shaped, receiving portion 14 of the lid base body 11, the receiving portion 4 being configured to receive the sealing element 12. The receiving portion 14 of the lid base body 11 extends along the outer circumference of the lid base body 11, particularly the wall portion of the lid base body 11 facing a wall portion of a side wall element 8 of the powder module base body 6 in the closed state of the powder module device 1. Receiving the sealing element 12 in the receiving portion 14 of the lid base body 11 comprises a, particularly non-detachable, attachment or connection of the sealing element 12 to or with the lid base body 11. Only as an example, the sealing element 12 may be clamped, glued welded to the lid base body 11.

Figure 2:
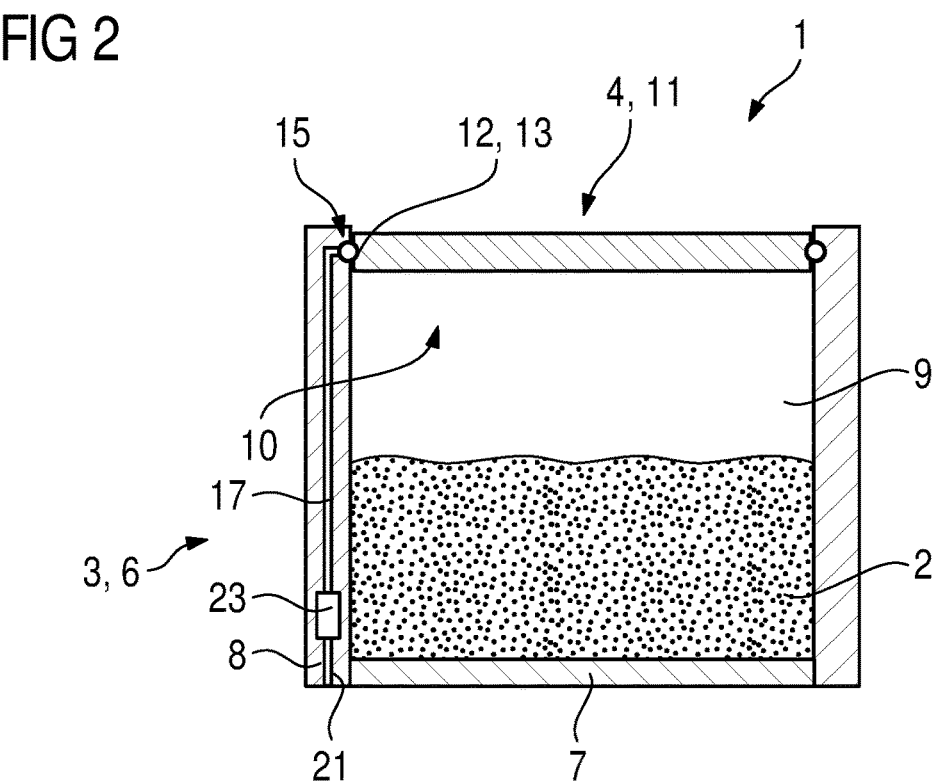

According to the embodiment depicted in FIG. 2, the sealing element 12 is attached to or connected with the powder module base body 6. Thereby, it is received in a, particularly groove-like shaped, receiving portion 15 of the powder module base body 6, the receiving portion 15 being configured to receive the sealing element 12. The receiving portion 15 of the powder module base body 6 extends along the inner circumference of the powder module base body 6, particularly the wall portion of the side wall element 8 of the powder module base body 6 facing a wall portion of the lid base body 11 in the closed state of the powder module device 1. Receiving the sealing element 12 in the receiving portion 15 of the powder module base body 6 comprises a, particularly non-detachable, attachment or connection of the sealing element 12 to or with the powder module base body 6. Only as an example, the sealing element 12 may be clamped, glued welded to the powder module base body 6.

As is discernible from FIG. 1-4, the lid base body 11 or the powder module base body 6, respectively comprises a streaming channel structure 16, 17 extending within the lid base body 11 or the powder module base body 6, respectively. The streaming channel structure 16, 17, which is fully integrated within the lid base body 11 or the powder module base body 6, respectively, provides a streaming path for the expansion medium to and from the expandable volume 13, i.e. a streaming path for the expansion medium during filling or unfilling of the sealing element 12. The streaming channel structure 16, 17 comprises a first connecting portion 28, 29 for connecting the streaming channel structure 16, 17 with the expandable volume 13 of the sealing element 12 and a second connecting portion 30, 31 for connecting the streaming channel structure 16, 17 with a filling device (not shown), e.g. a compressor, pump, etc., for filling or unfilling the expandable volume 13 with the expansion medium. Hence, the first connecting portion 29, 29 communicates with the expandable volume 13 of the sealing element 12 and the second connecting portion 30, 31 communicates with a filling device for filling or unfilling the expandable volume 13 with the expansion medium.

In the embodiment of FIG. 1, 3, 4, in which the streaming channel structure 16 is provided with the lid base body 11, the second connecting portion 30, 31 is provided at a handling portion, e.g. a grasping or gripping portion, of the lid base body 11 which is configured to co-act with a handling device (not shown), e.g. a robot, for manually, semi-automatically, or automatically handling the lid base body 11.

In both the embodiments of FIG. 1, 2, a valve device 23 is disposed between the first connecting portion 28, 29 and the second connecting portion 30, 31 of the respective streaming channel structure 16, 17.

Figure 6:
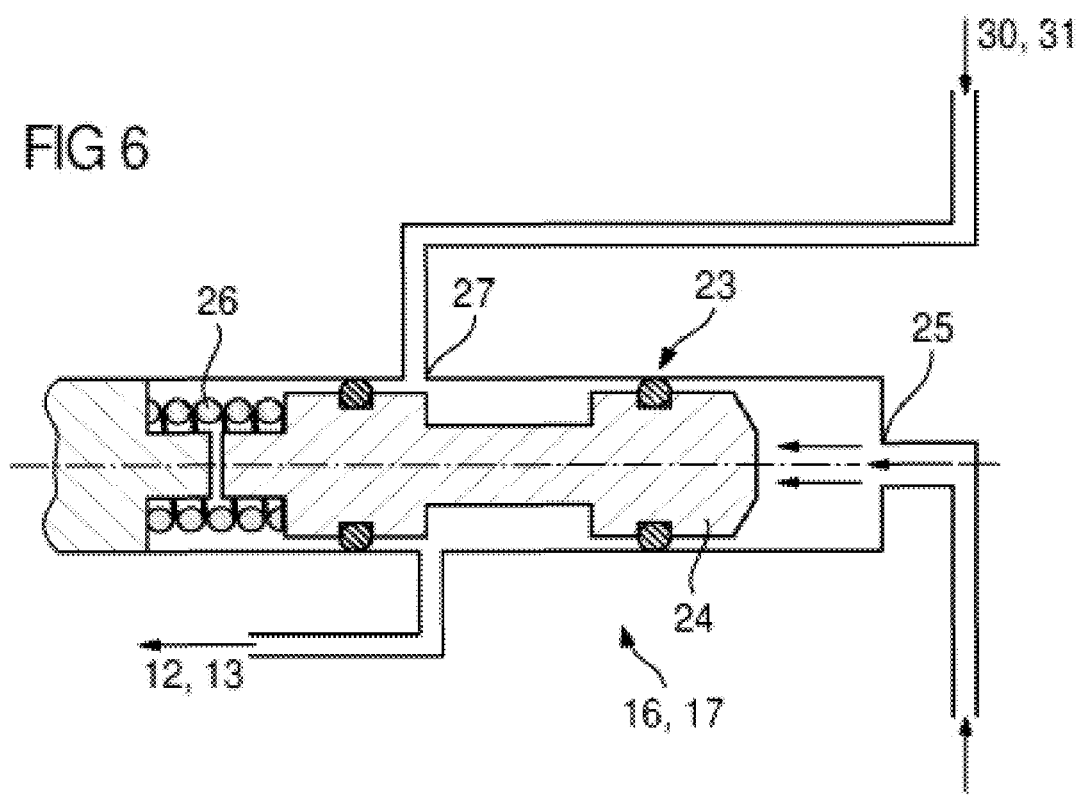

FIG. 5, 6 show an exemplary embodiment of a respective valve device 23 in a cut-view. As is discernible from FIG. 5, 6, the valve device 23 comprises a valve element 24 which is moveably supported between a first operational or closed state (see FIG. 5), in which filling the expandable volume 13 with the expansion medium is not possible and a second operational or open state (see FIG. 6), in which filling the expandable volume 13 of the sealing element 12 with the expansion medium is possible. In the second operational state, the valve element 24 is orientated and/or positioned in such a manner that it creates a passageway for the expansion medium through the valve device 24 so as to allow for filling or unfilling the expandable volume 13 of the sealing element 12.

As is discernible from FIG. 5, 6, the valve device 23 comprises different ports having different functionalities. A first port 25 of the valve device 23 is conceived for applying a, particularly pressurized, control medium for moving the valve element 24 against the force of a spring element 26 moving/urging the valve element 24 towards the first operational state. Thus, the control medium, e.g. a control gas or a control liquid, may stream into the valve device via the first port 25 so as to move the valve element 24 from the first operational state to the second operational state. The control medium may be provided from the filling device for filling or unfilling the expandable volume 13 with the expansion medium or a separate supplying device, e.g. a compressor, pump, etc., for supplying the control medium.

A second port 27 of the valve device 23 is conceived for introducing the expansion medium for expanding the sealing element 13 from the second expanded state in the first expanded state. Thus, the expansion medium may stream into the valve device 23 via the second port 27 so as to change the volume of the sealing element 12, i.e. to bring the sealing element 12 in the first or second expansion state. The expansion medium can/will only be introduced via the second port 27 when the valve element 24 is moved to the second operational state in which a passageway for the expansion medium through the valve device 23 is created.

Although not depicted in the FIG. the powder module device 1 may comprise a plurality of sealing elements 12. At least one sealing element 12 may be received in a respective receiving portion 15 of the powder module base body 6 and at least one further sealing element 12 may be received in a respective receiving portion 14 of the lid base body 11. In either case, the plurality of sealing elements 12 may be disposed on top of each other in the closed state of the powder module device 1.

FIG. 7 shows a principle drawing of an apparatus 18 for additively manufacturing three-dimensional objects according to an exemplary embodiment. FIG. 7 shows a sectional cut-view of the apparatus 18 which includes parts of the process chamber 19 of the apparatus 18.

The apparatus comprises at least one powder module device 1. The powder module device 1 corresponds to the one depicted in FIG. 1. The powder module device 1 may be embodied as a build module.

The powder module device 1 comprises a first lid 4. The first lid 4 comprises a lid base body 11 configured to be connected to the powder module base body 6 so as to close the opening of the powder module base body 6 in a closed state of the powder module device 1. The powder module device 1 further comprises a sealing device 5 as specified in context with the powder module device 1 according to FIG. 1.

The apparatus further comprises at least one second lid 4. The second lid 4 comprises a lid base body 11 configured to be connected with a machine frame 20 of the apparatus 18, particularly at a powder module docking portion 21 defining a docking interface at which a powder module device 1 can dock to the machine frame 20 of the apparatus 18, so as to close an opening 22 in the machine frame 20 of the apparatus 18, particularly at the powder module docking portion 21. The second lid 4 is configured as the first lid 4 and thus, comprises a sealing device 5. The sealing device 5 is configured to seal, particularly fluid-proof, between the machine frame 20 of the apparatus 18 and the second lid 4 in the closed state of the machine frame 20 of the apparatus 18. The sealing device 5 comprises at least one expandable sealing element 12. The expandable sealing element 12 comprises at least one expandable volume 13 which is at least partly fillable with an expansion medium so as to expand the expandable sealing element 12 from a first expansion state to a second expansion state.

Both the first and second lid 4 serve to, in particular co-act to, provide a sealable, particularly fluid-proof, lock (double-lock) between the powder module device 1 docked at the machine frame 21 of the apparatus 18, i.e. at a powder module docking portion 21 which typically is or comprises an opening in the bottom of the process chamber 19 of the apparatus 18, and the process chamber 19 of the apparatus 18. As is discernible from FIG. 17, a first lock assigned to the powder module device 1, i.e. in the region of the powder module device 1, can be built by the first lid 4 and a second lock assigned to the machine frame 20 of the apparatus 18, i.e. in the region of the machine frame 20 of the apparatus 18, can be built by the second lid 4.

FIG. 7 shows that the second lid 4 can be disposed above the first lid 4 when the powder module device 1 is in the docking position. Hence, the first and second lids 4 can be disposed in a parallel or stack-like arrangement. Thereby, the first lid 4 is connectable or connected with the powder module 3 (base body 6) and the second lid 4 is connectable or connected with the machine frame 20 of the apparatus 18.

The apparatus 18 allows for implementing a method for docking a powder module device 1 to the apparatus 18. The method comprises the steps of:

a) disposing a powder module device 1 in a docking position in which it is docked at the machine frame 20 of the apparatus 18, b) disconnecting and removing the first lid 4 provided with the powder module device 1 from the powder module device 1, and c) disconnecting and removing the second lid 4 from the machine frame 20 of the apparatus 1 so as to open a passageway from the build material receiving volume of the powder module base body 6 to the process chamber 19 of the apparatus 18.

Steps b) and c) may be executed simultaneously or in a different order. All steps may be executed at least in semi-automatic manner.

The apparatus 18 further allows for implementing a method for undocking a powder module device 1 from the apparatus 18. The method comprises the steps of:

a) connecting the first lid 4 provided with the powder module device 1 with the powder module device 1 being disposed in a docking position in in which it is docked at the machine frame 20 of the apparatus 18;

b) connecting the second lid 4 with the machine frame 20 of the apparatus 18 so as to close a passageway from the build material receiving volume 9 of the powder module base body 6 to the process chamber 19 of the apparatus 18; and c) removing the powder module device 1 disposed in the docking position in which it is docked at the machine frame 20 of the apparatus 18 from the docking position.

Steps a) and b) may be executed simultaneously or in a different order. All steps may be executed at least in semi-automatic manner.

The invention claimed is:

1. A powder module device of an apparatus for additively manufacturing three-dimensional objects by successive layerwise selective irradiation and consolidation of layers of a powdered build material with an energy beam, comprising:
   a powder module, comprising:
      a powder module base body configured to receive a powdered build material,
      a bottom wall element,
      at least one side wall element, wherein the bottom wall element and the at least one side wall element delimit a build material receiving volume, and
      an opening for introducing a powdered build material into the build material receiving volume, wherein, in a docking position, the opening of the powder module and an opening of a process chamber of an apparatus together provide a passageway between the build material receiving volume and the process chamber in an open state of the powder module device;
   a lid, comprising a lid base body configured to be connected to the powder module base body to close the opening of the powder module base body in a closed state of the powder module device;
   a sealing device configured to provide a seal between the powder module and the lid in the closed state of the powder module device, the sealing device comprising at least one expandable sealing element, the expandable sealing element comprising at least one expandable volume which is at least partly fillable with a pressurized expansion medium so as to expand the expandable sealing element from a first expansion state to a second expansion state; and
   a streaming channel structure extending within at least one of the lid base body or the powder module base body, the streaming channel structure in fluid communication with the at least one expandable volume.

2. The powder module device according to claim 1, wherein the at least one expandable sealing element does not provide a fluid-proof seal between the powder module and the lid in the first expansion state and does provide a fluid-proof seal between the powder module and the lid in the second expansion state.

3. The powder module device according to claim 1, wherein the at least one expandable volume is fillable with a gaseous expansion medium, whereby a first filling state of the expandable volume corresponds to the first expansion state of the expandable sealing element and a second filling state of the expandable volume corresponds to the second expansion state of the expandable sealing element.

4. The powder module device according to claim 1, wherein the at least one sealing element is connected with the lid base body, whereby it is received in at least one groove-like receiving portion of the lid base body, the receiving portion being configured to receive the expandable sealing element.

5. The powder module device according to claim 4, wherein the receiving portion at least partly extends along an outer circumference of the lid base body in the closed state of the powder module device.

6. The powder module device according to claim 1, wherein the at least one sealing element is connected with the powder module base body, whereby it is received in at least one groove-like receiving portion of the powder module base body, the receiving portion being configured to receive the expandable sealing element.

7. The powder module device according to claim 6, wherein the receiving portion at least partly extends along an inner circumference of the powder module base body, and along a wall portion of a side wall element of the powder module base body facing a wall portion of the lid base body in the closed state of the powder module device.

8. The powder module device according to claim 1, wherein the streaming channel structure comprises a first connecting portion for connecting the streaming channel structure with the expandable volume of the expandable sealing element and a second connecting portion for connecting the streaming channel structure with a filling device for filling or unfilling the expandable volume of the sealing element with the expansion medium.

9. The powder module device according to claim 8, wherein the second connecting portion is provided at a handling portion of the lid base body which is configured to co-act with a handling device for handling the lid base body.

10. The powder module device according to claim 8, wherein at least one valve device is disposed between the first connecting portion and the second connecting portion of the streaming channel structure, the valve device comprising at least one valve element which is moveably supported between a first operational state in which filling the expandable volume of the expandable sealing element with the expansion medium is not possible and a second operational state in which filling the expandable volume of the expandable sealing element is possible.

11. The powder module device according to claim 10, wherein the valve device comprises a first port for applying a pressurized control medium for moving the valve element.

12. The powder module device according to claim 10, wherein the valve device comprises a second port for introducing the expansion medium for expanding the expandable sealing element.

13. The powder module device according to claim 1, comprising a plurality of expandable sealing elements disposed on top of each other in the closed state of the powder module device.

14. The powder module device according to claim 5, wherein the receiving portion extends along a wall portion of the lid base body facing a wall portion of a wall element of the powder module base body in the closed state of the powder module device.

15. The powder module device according to claim 11, wherein the first port is configured for applying the pressurized control medium for moving the valve element against the force of at least one spring element moving/urging the at least one valve element towards the first operational state.

* * * * *